US008027976B1

(12) United States Patent
Ding et al.

(10) Patent No.: US 8,027,976 B1
(45) Date of Patent: Sep. 27, 2011

(54) ENTERPRISE CONTENT SEARCH THROUGH SEARCHABLE LINKS

(75) Inventors: Dongling Ding, San Jose, CA (US); Kash Mohammadi, Simi Valley, CA (US)

(73) Assignee: Oracle International Corporation, Redwood Shores, CA (US)

( * ) Notice: Subject to any disclaimer, the term of this patent is extended or adjusted under 35 U.S.C. 154(b) by 250 days.

(21) Appl. No.: 11/211,070

(22) Filed: Aug. 23, 2005

(51) Int. Cl.
*G06F 7/00* (2006.01)
*G06F 17/30* (2006.01)

(52) U.S. Cl. ........................................ 707/736; 707/755
(58) Field of Classification Search ........................ None
See application file for complete search history.

(56) References Cited

U.S. PATENT DOCUMENTS

| | | | | |
|---|---|---|---|---|
| 5,913,208 | A * | 6/1999 | Brown et al. ................. | 707/706 |
| 6,295,559 | B1 * | 9/2001 | Emens et al. ...................... | 707/1 |
| 6,480,837 | B1 * | 11/2002 | Dutta ............................... | 707/3 |
| 6,490,575 | B1 * | 12/2002 | Berstis .............................. | 707/3 |
| 6,643,661 | B2 * | 11/2003 | Polizzi et al. ................. | 707/100 |
| 6,836,779 | B2 * | 12/2004 | Poulin ....................... | 707/103 R |
| 6,850,893 | B2 * | 2/2005 | Lipkin et al. ..................... | 707/1 |
| 7,233,950 | B2 * | 6/2007 | Smith, III ....................... | 707/10 |
| 2003/0074204 | A1 * | 4/2003 | Krothapalli et al. .............. | 705/1 |
| 2004/0128270 | A1 * | 7/2004 | Bachman et al. .................. | 707/1 |
| 2004/0143569 | A1 * | 7/2004 | Gross et al. ......................... | 707/3 |
| 2004/0158584 | A1 * | 8/2004 | Necsoiu et al. ............ | 707/104.1 |
| 2004/0177057 | A1 * | 9/2004 | Fairchild et al. ................... | 707/1 |
| 2005/0050028 | A1 * | 3/2005 | Rose et al. ......................... | 707/3 |
| 2005/0149500 | A1 * | 7/2005 | Marmaros et al. ................ | 707/3 |
| 2005/0256841 | A1 * | 11/2005 | Rawat et al. ...................... | 707/1 |
| 2006/0023945 | A1 * | 2/2006 | King et al. ......................... | 707/3 |
| 2006/0155685 | A1 * | 7/2006 | Grim et al. ......................... | 707/3 |
| 2007/0130068 | A1 * | 6/2007 | Kitazato et al. ................. | 705/50 |

\* cited by examiner

*Primary Examiner* — Debbie Le
*Assistant Examiner* — Thomas Meng
(74) *Attorney, Agent, or Firm* — Kilpatrick Townsend & Stockton LLP (57) ABSTRACT

A solution is provided that allows end users to search documents in multiple remote content repositories in an enterprise environment, while maintaining security of those documents. Additionally, end users are able to search for a document without knowing which server or directory it is stored under. This is accomplished by installing a search agent on the end user's machine. The search engine collects the metadata of authorized documents located in different repositories via a web protocol (such as Hypertext Transfer Protocol, or HTTP) and stores them in the user's local memory as "searchable links". This solves the enterprise content search problem through the creation of searchable links of remote content objects in an end user's local machine while allowing emerging desktop-search technology to index them.

19 Claims, 7 Drawing Sheets

FIG. 1 http://127.0.0.1:4664/config&s=332322

Configuration

User:
Password:
Hub Server:

Hyperion Contents (Mark it if you don't want to search for):

. Server1  . Server2  . Server3

Search Types (Mark it if you want Search Agent to search for them)

. Word    . Excel  . Report . PowerPoint

[Save] [Cancel]

FIG. 2

```
<searchAgent>
    <!--It is the hub location a Search agent connects to-->
    <hubLocation>http://myserver:8080</hubLocation>
    <interval/>
    <!--It is the user credential to access contents: the password is encrypted because of security concern-->
    <user>
        <userid>David</userid>
        <password>"Encoded Password"</password>
    </user>
    <!--It is the list of product servers that are searchable; a user can choose not to search anyone of them-->
    <contentServers>
        <contentServer name="Report Server1" url="http://reportServer:8989/">Y</contentServer>
        <contentServer name="Report Server2" url="http://reportServer2:1234">Y</contentServer>
    </contentServers>
    <!--It must specify which content type. -->
    <contentTypes>
        <contentType name="HTML" extension="">Y</contentType>
        <contentType name="Excel">Y</contentType>
        <contentType name="PowerPoint">Y</contentType>
        <contentType name="Text">N</contentType>
        <contentType name="Report" extension=".rpt">Y</contentType>
    </contentTypes>
</searchAgent>
```

```
<HTML>
<HEAD>
<TITLE>BMV Corporation Revenue Summary</TITLE>
</HEAD>
<body>
<script language="JavaScript">
   function GetPassword()
   {
         //Access the cookie stored by the Search Agent
         return "Mypassword";
   }
</script>
<script language="JavaScript">
         var password = GetPassword();
         document.write("<META HTTP-EQUIV=\"Refresh\" CONTENT=\"0;");
         document.write("URL=http://ctg/files/joyce/search/proposal.ppt"
                  + "&sso_username=David&sso_password=" + password + "\"");

</script>
<span class="name">BMV Corporation Revenue Summary</span>
<span class="description">Xls file</span>
</body>
</HTML>
```

FIG. 7

ENTERPRISE CONTENT SEARCH THROUGH SEARCHABLE LINKS

FIELD OF THE INVENTION

The present invention relates to the field of content searching. More specifically, the present invention relates to performing secure enterprise content searches of remote repositories through searchable links located in an end user's machine.

BACKGROUND OF THE INVENTION

The Internet has become a popular tool for locating relevant information. Through the World Wide Web and other publicly available databases, vast amounts of information are now accessible to users throughout the world. Search engines and directories are utilized to aid the user in the search for the most relevant information pertaining to a given query. Examples of such search engines and directories include Google™, Yahoo™, and Excite™, among many others. These search engines and directories work by building centralized index databases and directories, which can be queried quickly and reliably.

Recently, several companies have introduced Desktop Search tools, which integrate traditional search engines with the capability to search a user's local machine or network. For example, a vendor such as Google™, Microsoft™, or Yahoo™ might provide a downloadable program which a user may install on his machine. The program may then provide a single search tool where the user can search for information from the Internet at large as well as from his local machine or network with a single search.

These Desktop Search tools, however, do not solve the problem of security associated with enterprise contents. Namely, while a user searching his own hard drive may not present a security concern, a user searching hard drives of others within an enterprise, or accessible server content within an enterprise, may present security concerns. Most enterprises have certain document that are confidential, and many enterprises have complex security hierarchies limiting access to many different documents, directories, servers, etc.

While Desktop Search tools may have some security features, they all rely on general security policies to determine which files to index. Thus, an administrator may restrict certain files from being indexed, thus rendering them unsearchable by others. There is no way to allow a document to be indexed and searchable to only selected users. While the underlying document itself could still be password-protected, in order to allow those with the password to find the document, the document must be indexed and searchable to all users in the Enterprise. This presents security problems because the index information can sometimes contain information that is confidential, and sometimes the mere fact that a file exists is confidential.

What is needed is a solution that allows enterprise users to search documents in multiple remote content repositories in an enterprise environment while addressing security concerns.

BRIEF DESCRIPTION

A solution is provided that allows end users to search documents in multiple remote content repositories in an enterprise environment, while maintaining security of those documents. Additionally, end users are able to search for a document without knowing which server or directory it is stored under. This is accomplished by installing a search agent on the end user's machine. The search engine collects the metadata of authorized documents located in different repositories via a web protocol (such as Hypertext Transfer Protocol, or HTTP) and stores them in the user's local memory as "searchable links". This solves the enterprise content search problem through the creation of searchable links of remote content objects in an end user's local machine while allowing emerging desktop-search technology to index them.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

A solution is provided that allows end users to search documents in multiple remote content repositories in an enterprise environment, while maintaining security of those documents. Additionally, end users are able to search for a document without knowing which server or directory it is stored under. This is accomplished by installing a search agent on the end user's machine. The search engine collects the metadata of authorized documents located in different repositories via a web protocol (such as Hypertext Transfer Protocol, or HTTP) and stores them in the user's local memory as "searchable links". This solves the enterprise content search problem through the creation of searchable links of remote content objects in an end user's local machine while allowing emerging desktop-search technology to index them.

In an embodiment of the present invention, the searchable link may be a small HyperText Markup Language (HTML) document containing metadata about a content object residing in a remote content server. The metadata may include information such as title, description, and content type. The metadata may contain a URL to access the content object itself. The URL may include an end user identity used for performing authorization. Since the searchable link is located in the end user's machine, and desktop search tool, such as the one's described in the background section, can index it. When a user performs a desktop content search by using one of the desktop search tools, the searchable link may be returned as part of the search results. The user may then click on the searchable link, which allows the browser to redirect to the corresponding URL through the HTTP Meta Tag "Refresh" to access the real content object itself.

The search agent may be a Windows-based application, which runs in the background on an end user's desktop. A desktop search tool may then be installed to index and search the contents. The search agent may talk to a hub as well as product servers within an enterprise to search for the metadata of content objects, bring them into the end user's desktop, and store them as searchable links so that a desktop search tool can index them.

Figure 1:
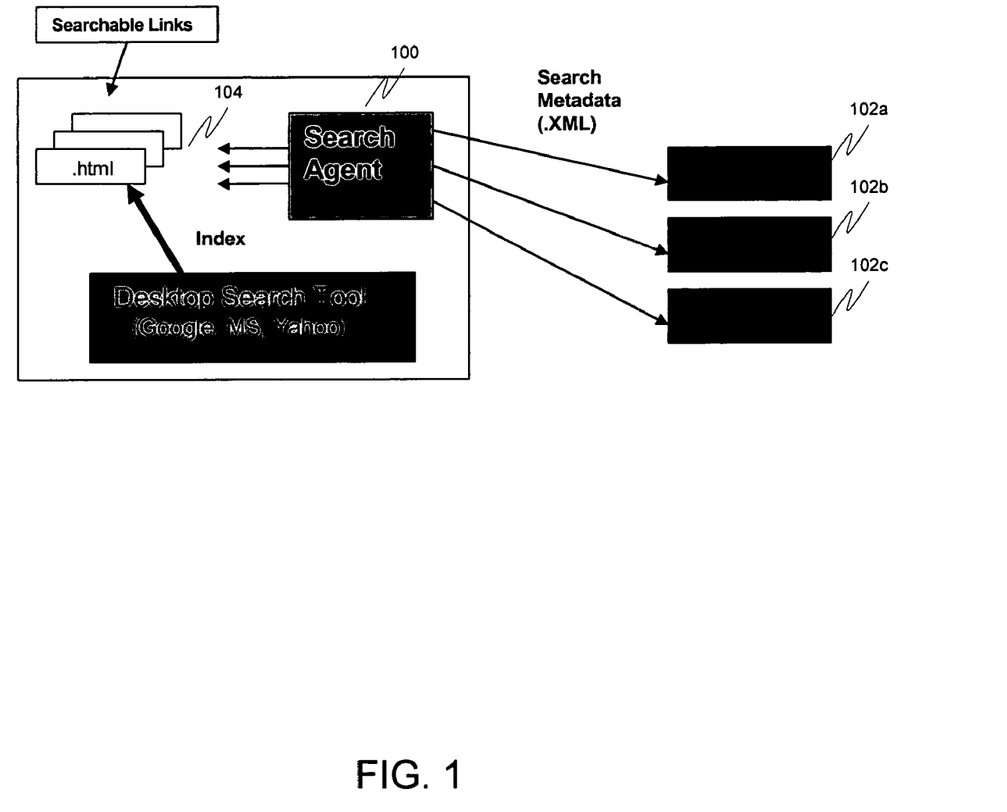
FIG. 1 is a block diagram illustrating the relationship between a search agent, a desktop search tool, and product servers in accordance with an embodiment of the present invention.

FIG. 1 is a block diagram illustrating the relationship between a search agent, a desktop search tool, and product servers in accordance with an embodiment of the present invention. The search agent 100 may search for metadata periodically (or alternatively, upon a user's request) by issuing a web request "search metadata". This request may be communicated to the product servers 102a, 102b, 102c through, for example, an HTTP-based protocol called Content Metadata Search Protocol (CMSP). In an embodiment of the present invention, the metadata of content objects may be represented in XML format. The search agent 100 may convert the metadata into searchable links 104 in, for example, HTML, which each contain a URL of a real object stored in one of the product servers 102a, 102b, 102c.

A configuration user interface of the search agent 100 may allow the user to customize the way that a search agent searches for metadata from product servers 102a, 102b, 102c. Through the configuration user interface, a user may be asked to provide his or her user identification and password for accessing protected material so that a product server can perform authentication as well as authorization when responding to a "search metadata" request and accessing the document. Once a particular product server has been configured for the user, however, the user does not need to enter his user identification and password again. This allows the search itself to proceed without the user entering his identification or password, which both greatly speeds up searching, as well as reducing the incidence of the common problem of user's forgetting their identifications and/or passwords. Only if the product server needs to be reconfigured, or the security settings change on the product server such that a new password is required, would the user have to re-enter the identification or password information.

The search agent 100 may always carry a user credential when it communicates with a product server 102a, 102b, 102c. The product server 102a, 102b, 102c may then performed an access control check before returning any content or metadata of content to a user.

Figure 2:
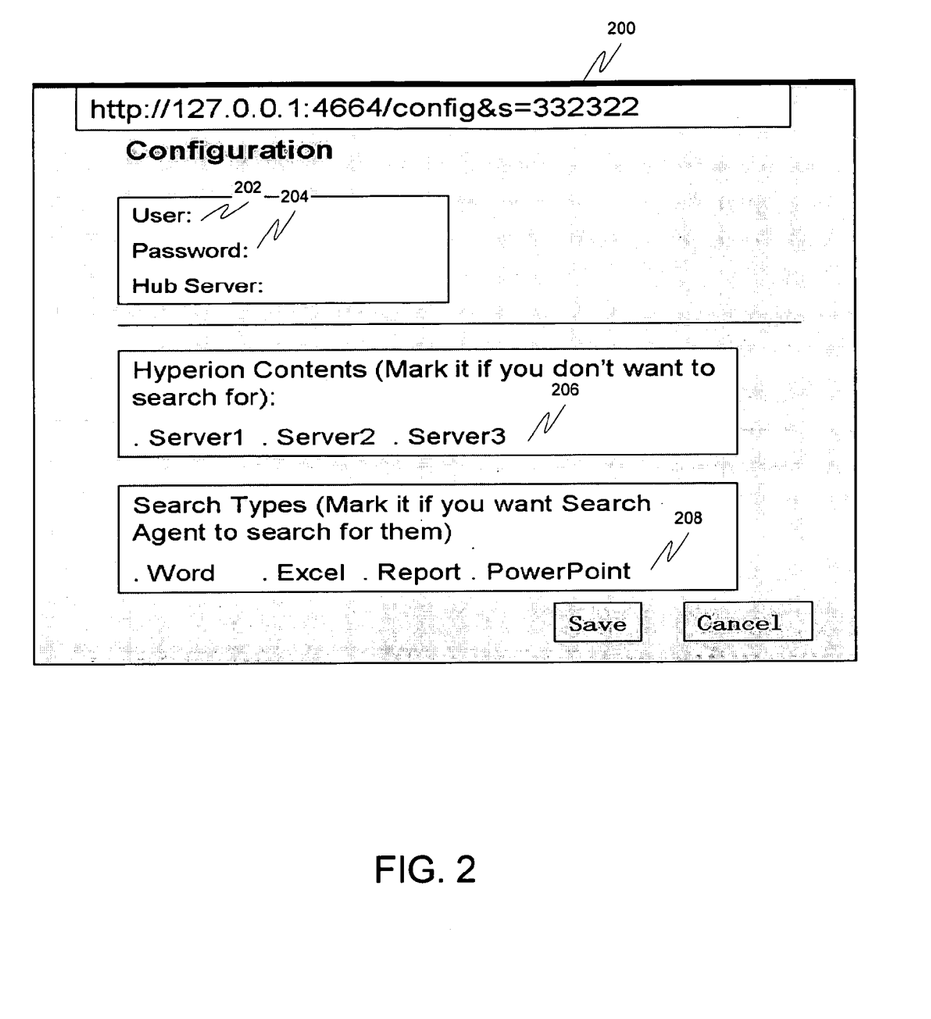
FIG. 2 is a screen capture illustrating a search engine configuration user interface in accordance with an embodiment of the present invention.

FIG. 2 is a screen capture illustrating a search engine configuration user interface in accordance with an embodiment of the present invention. In this embodiment, a web form 200 is utilized. When the user opens the configuration user interface, the search agent may start an HTTP server (using one thread) and open a new browser window. The thread may end when the user saves the configuration on or after a particular time. This interface allows a user to enter a user identification 202 and a password 204. It further may allow the user to customize the way the search engine operates, such as searching particular servers 206, and file types 208. In an embodiment of the present invention, the configuration information may be saved in an Extensible Markup Language (XML) file, in which the userid/password may be encrypted and not readable. In the meantime, the user identification and password may be sent back to the browser as a cookie, which can be used in a searchable link.

Figure 3:
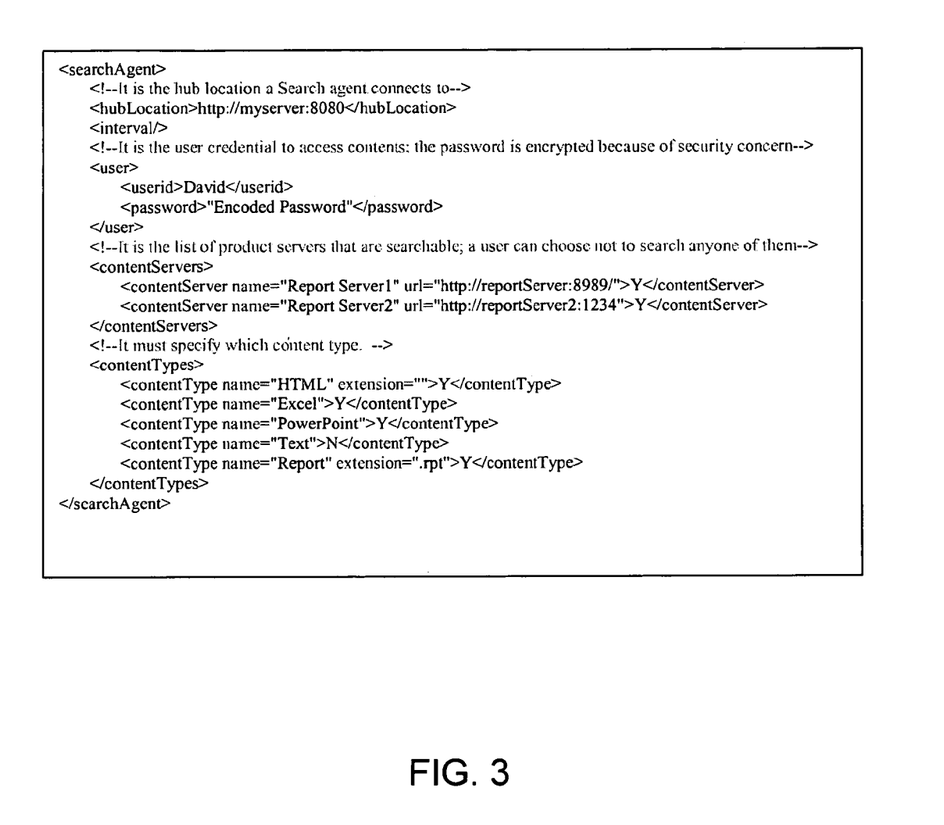
FIG. 3 is an example of a configuration file stored in XML in accordance with an embodiment of the present invention.

FIG. 3 is an example of a configuration file stored in XML in accordance with an embodiment of the present invention. The hub location that was entered by the user may be used by the search agent to connect to a search service in order to get a list of searchable product servers. The user's password may be encrypted. The value of the element "contentServer" may indicate if a user wants to search contents stored on a particular server. The value of element "contentType" may indicate if a user is interested in a particular content type. By default, the value of both "contentServer" and "contentType" may be set to "Y". The list of content types may be predefined by search services and displayed in the configuration user interface for a user to choose.

Other than handling configuration, a search agent may perform two major tasks. It may search the metadata of content objects from the registered product servers, as well as create a searchable link for each content object to which a user has access.

In an embodiment of the present invention, searching the metadata of content objects from registered product servers may involve sending an HTTP request based on the Content Metadata Search Protocol (CMSP) to a product server in order to get the metadata of content objects. The configuration information stored in the configuration file may be used to construct search terms (e.g., selected content types) and to connect to the correct product servers. As described earlier, the action "search metadata" may be invoked automatically based on an interval setting or by a user's action by clicking on a menu item to force a search.

Creating a searchable link for each content object to which a user has access to may be performed when a search agent receives the metadata of a content object. It may convert this object into a searchable link and store it under a directory of the user's local drive. In an embodiment of the present invention, a each directory may represent a remote product server.

In an embodiment of the present invention, a searchable link may be a small HTML document that contains the metadata of a content object stored in a product server. The size may be about 1K. All the searchable links referring to a single product server may be stored under the same directory. The reason that HTML may be utilized rather than simply storing the XML document received from the product server is that desktop search tools are not currently able to search XML files. One of ordinary skill in the art will recognize, however, that the invention may be modified to store the searchable link in any format, as desktop search tools may evolve to be compatible with any number of different formats.

Nevertheless, in an embodiment of the present invention, the received XML file is converted into one or more HTML files. The XML file may contain "record" elements, each record corresponding to one document in the remote repository to be converted into a searchable link. A "SPAN" tag may be used to "replace" the elements in XML. The element name in the response XML document may be represented as the "class" attribute. For example, the element "description" in the XML document may be converted into "<span class="description">".

Although most of the content in the searchable link comes from the element "record" in XML, the additional content of a searchable link may be added to meet the needs of searching specialized contents using the desktop search tool. For example, the search agent may insert a span tag into each searchable link which includes the company name, such as "<span class="type">COMPANYNAMECONTENT</span>". The search service may define this keyword. This ensures that searchable links most likely show up on the top of a search result when a user wants to search for such content using a desktop search tool.

Figure 4:
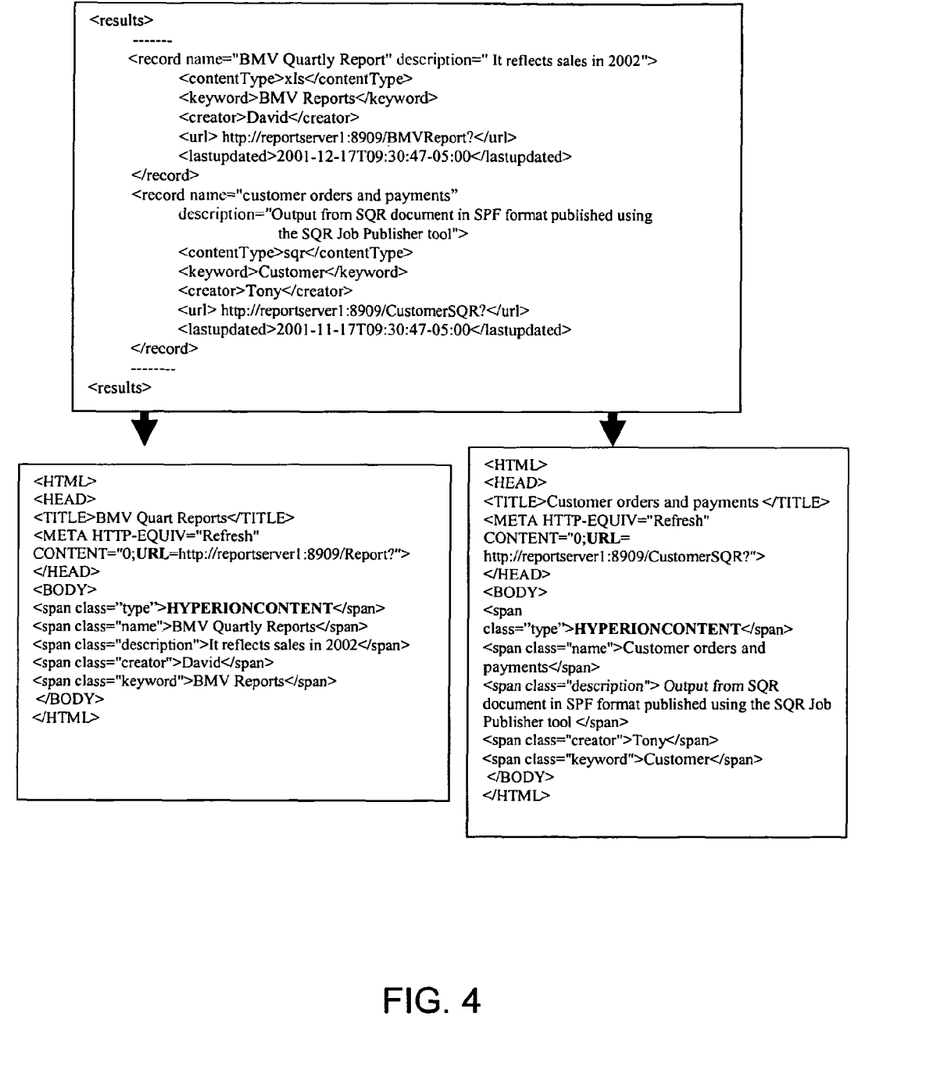
FIG. 4 is a diagram illustrating an example of the conversion of an XML document received from the product server to a searchable link in HTML format in accordance with an embodiment of the present invention.

FIG. 4 is a diagram illustrating an example of the conversion of an XML document received from the product server to a searchable link in HTML format in accordance with an embodiment of the present invention.

The URL information provided in the element "record" may be used to access a real content object when a user clicks on the searchable link. Because any content object is associated with an access control rule, the URL may contain user/password for authorization. However, a searchable link cannot contain a password in plan text format within the URL. The solution is to dynamically insert the user id/password into the URL when a user clicks on the searchable link.

Figure 5:
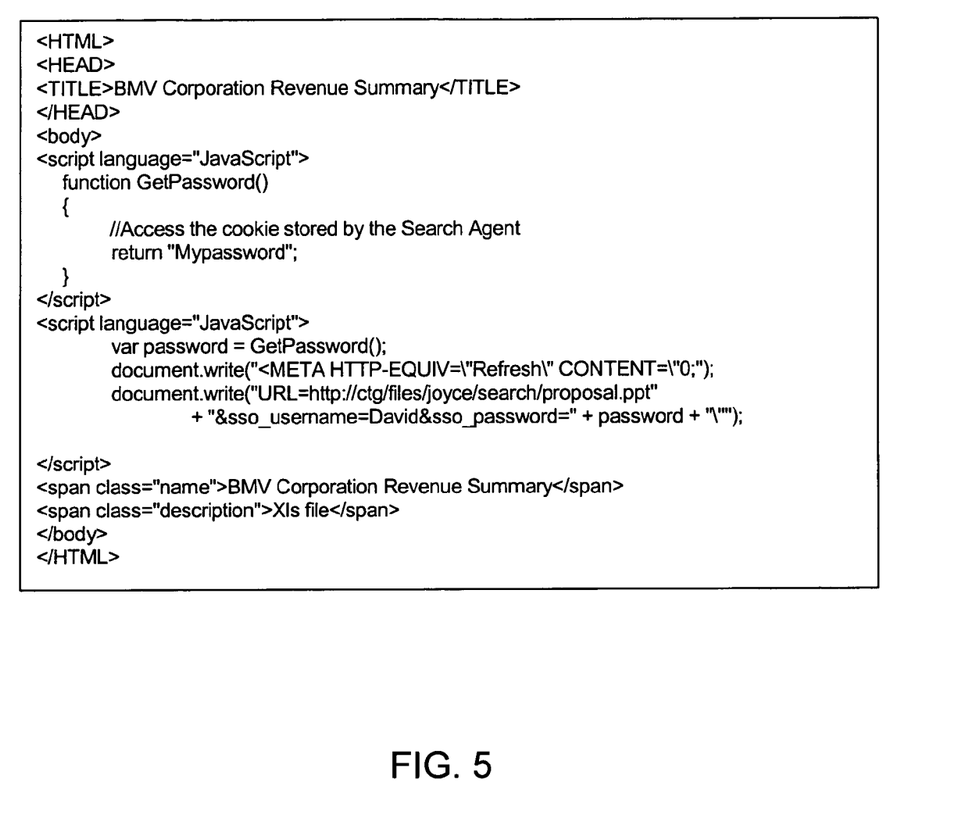
FIG. 5 is diagram illustrating an example of JavaScript to perform the construction of a launchable URL in accordance with an embodiment of the present invention.

The product server may send a URL for accessing the real content object, such as "URL="http://ctg/files/joyce/search/proposal.ppt". In an embodiment of the present invention, the search agent may convert this URL into a launchable URL, which contains the parameters sso_username and sso_password. All product servers should support the launchable URL. In this case, the launchable URL may look like:
 URL=http://ctg/files/joyce/search/proposal.ppt&sso_username=David&sso_password=mypassword Since the search agent cannot directly store the password in the URL, the above URL may be constructed by taking the password from the cookie in the browser. FIG. 5 is diagram illustrating an example of JavaScript to perform the construction of a launchable URL in accordance with an embodiment of the present invention. The searchable link may contain this JavaScript code. When a user clicks on the searchable link, the JavaScript code may be executed, which retrieves the user's credential information from the agent and constructs the launchable URL, to which it then redirects the user.

Contents in a content repository may change frequently. When changing a content object, its metadata may change as well. Furthermore, the addition and deletion of content objects should cause the addition or deletion of searchable links, which are stored in user's machines. As such, in accordance with an embodiment of the present invention, the search agent may use a simple algorithm to update the searchable links. This may overwrite all the searchable links in the appropriate directory. Additionally, the search agent may delete all existing searchable links before creating them periodically (such as one a day). This would ensure that a searchable link is removed when its corresponding content object is deleted from the repository.

Figure 6:
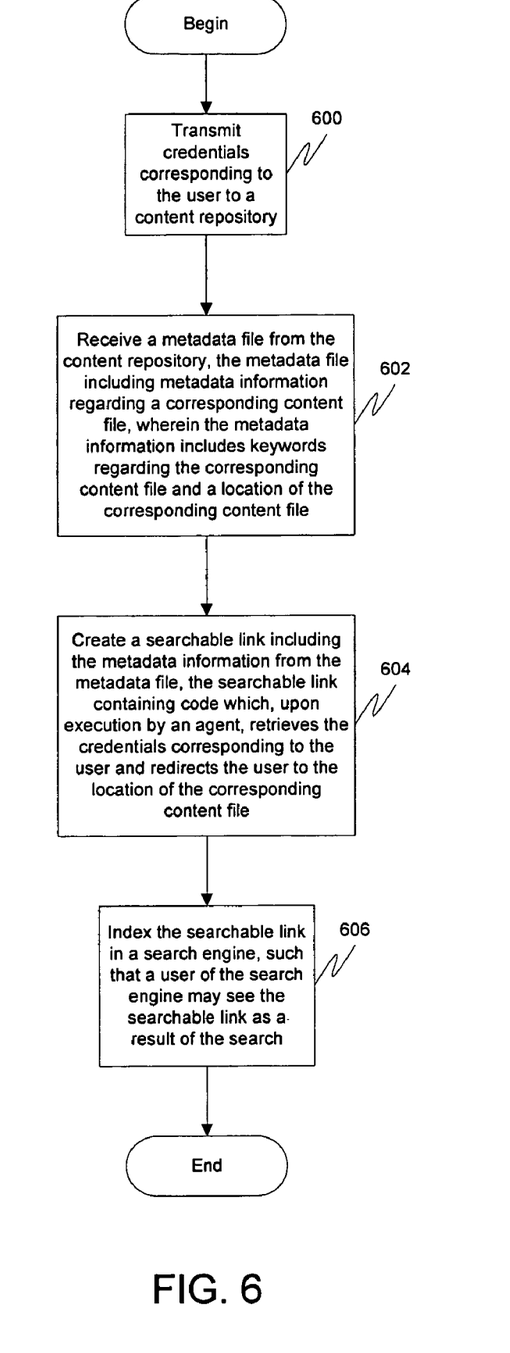
FIG. 6 is a flow diagram illustrating a method for preparing a user's computer for an enterprise content search in accordance with an embodiment of the present invention.

FIG. 6 is a flow diagram illustrating a method for preparing a user's computer for an enterprise content search in accordance with an embodiment of the present invention. At 600, credentials corresponding to the user may be transmitted to a content repository. These credentials may include, for example, user name and password. At 602, a metadata file may be received from the content repository, the metadata file including metadata information regarding a corresponding content file, wherein the metadata information includes keywords regarding the corresponding content file and a location of the corresponding content file. The metadata regarding a location of the corresponding content file may be a URL for the corresponding content file. At 604, a searchable link may be created including the metadata information from the metadata file, the searchable link containing code which, upon execution by an agent, retrieves the credentials corresponding to the user and redirects the user to the location of the corresponding content file. The code may redirect the user to the location of the corresponding content file by creating a launchable link to the location of the corresponding content file, the launchable link including the credentials such that the credentials are passed to the location of the corresponding content file upon following the launchable link. The metadata file may be an XML document and the searchable link may be an HTML document, and therefore the creating may include converting the metadata file into one or more HTML documents. As part of this, XML elements in the metadata file may be replaced with a "SPAN" tag. At 606, the searchable link may be indexed in a search engine, such that a user of the search engine may see the searchable link as a result of the search.

Figure 7:
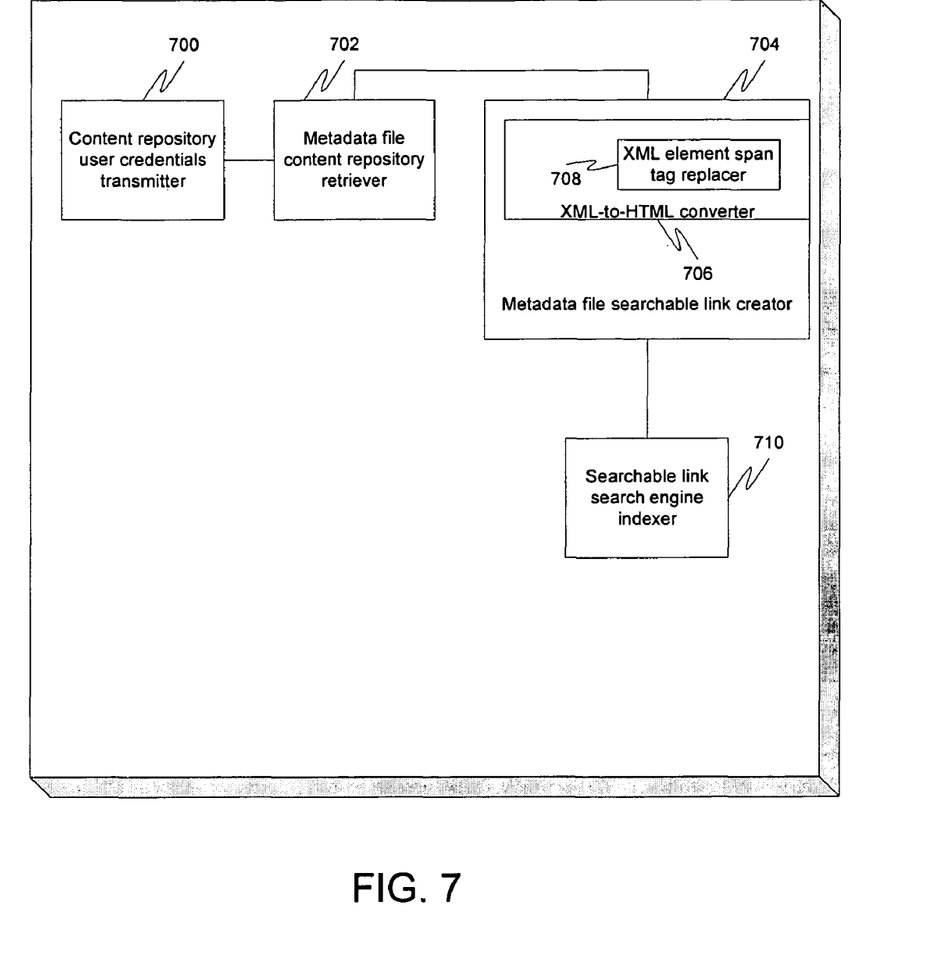
FIG. 7 is a block diagram illustrating an apparatus for preparing a user's computer for an enterprise content search in accordance with an embodiment of the present invention.

FIG. 7 is a block diagram illustrating an apparatus for preparing a user's computer for an enterprise content search in accordance with an embodiment of the present invention. A content repository user credentials transmitter 700 may transmit credentials corresponding to the user to a content repository. These credentials may include, for example, user name and password, or token information. A metadata file content repository retriever 702 coupled to the content repository user credentials transmitter 700 may receive a metadata file from the content repository, the metadata file including metadata information regarding a corresponding content file, wherein the metadata information includes keywords regarding the corresponding content file and a location of the corresponding content file. The metadata regarding a location of the corresponding content file may be a URL for the corresponding content file. A metadata file searchable link creator 704 coupled to the metadata file content repository retriever 702 may create a searchable link including the metadata information from the metadata file, the searchable link containing code which, upon execution by an agent, retrieves. the credentials corresponding to the user and redirects the user to the location of the corresponding content file. The code may redirect the user to the location of the corresponding content file by creating a launchable link to the location of the corresponding content file, the launchable link including the credentials such that the credentials are passed to the location of the corresponding content file upon following the launchable link. The metadata file may be an XML document and the searchable link may be an HTML document, and therefore the metadata file searchable link creator 704 may contain an XML-to-HTML converter 706 which may convert the metadata file into one or more HTML documents. As part of this, XML elements in the metadata file may be replaced with a "SPAN" tag. using an XML element span tag replace'r 708. A searchable link search engine indexer 710 coupled to the metadata file searchable link creator 704 may index the searchable link in a search engine, such that a user of the search engine may see the searchable link as a result of the search. It is anticipated that searchable link search engine indexer 710 would be a general search engine in order to take advantage of the possibility of searching for typical search engine results along with enterprise content results using the same search (or at least, the same engine). However, implementations having a stand-alone searchable link search engine indexer are possible as well.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

Some embodiments of the present disclosure may contain a program storage device readable by a machine. The program storage device may tangibly embody a program of instructions executable by the machine to perform a method for preparing a user's computer of an enterprise content search. It would be clear to a person of skill in the art that such a machine could be a computer. Program storage devices that tangibly embody a program of instructions would also be well known to a person of skill in the art.

What is claimed is:

1. A method for preparing a user's computer for an enterprise content search, the method comprising the steps of:
   receiving, at the user's computer, from a remote content repository at least one metadata portion in response to a request, the at least one metadata portion corresponding to at least one content file stored in the remote content repository;
   the at least one metadata portion comprising (a) one or more keywords regarding the corresponding content file and (b) a network location of the corresponding content file;
   converting, by the user's computer, data of the at least one metadata portion from a first format to a second format;
   storing, by the user's computer, on a local filesystem of the user's computer, at least one searchable metadata file that conforms to the second format,
   the at least one searchable metadata file comprising (a) the one or more keywords regarding the content file that corresponds to the at least one metadata portion, and (b) the network location of the content file that corresponds to the at least one metadata portion, wherein the at least one searchable metadata file is stored in a manner that allows a desktop search engine running on the user's computer to index the contents of the at least one searchable metadata file;
   creating, by the user's computer and in response to receiving the at least one metadata portion, an index file on the user's computer, the index file including an index of the contents of the at least one searchable metadata file stored on the local filesystem of the user's computer;
   creating a searchable link from the at least one searchable metadata file; wherein the searchable link is an HTML document and includes code and metadata of the corresponding content file; and
   clicking on the searchable link to execute the code in the searchable link to retrieve credential data and to redirect the user's computer to the corresponding content file's location by creating a launchable link to the corresponding content file's location wherein the launchable link is a URL and includes the credential data.

2. The method of claim 1, further comprising the steps of:
   receiving, from the user at the user's computer, credential data to authorize the user to access the plurality of content files; and
   storing the credential data on a local filesystem of the user's computer;
   wherein storing at least one searchable metadata file further comprises storing (d) one or more scripts which, when executed by an agent running on the user's computer, cause the agent to (1) read the credential data from a local filesystem of the user's computer and (2) retrieve, using the credential data, the at least one content file that corresponds to the at least one searchable metadata file from the remote content repository.

3. The method of claim 1, wherein the network location of the corresponding content file is specified as a Uniform Resource Locator (URL).

4. The method of claim 1, further comprising:
   indexing the at least one searchable metadata file by a desktop search engine installed on the user's computer.

5. The method of claim 1, wherein the at least one searchable metadata file stored on the filesystem of the user's computer is a Hypertext Markup Language (HTML) document.

6. The method of claim 1, wherein the at least one metadata portion is received in an extensible markup language (XML) document.

7. The method of claim 1, wherein said first format is extensible markup language (XML) and said second format is Hypertext Markup Language (HTML), and converting data of the at least one metadata portion includes converting XML data to HTML data.

8. The method of claim 7, wherein said converting XML data to HTML data includes replacing one or more extensible markup language (XML) elements with a "SPAN" tag.

9. The method of claim 1, further comprising
   receiving, at the user's computer, a search query;
   searching, by the user's computer and using the index file, the contents of the at least one searchable metadata file to generate search results that reference at least one matching metadata file, wherein the contents of the matching metadata file match the search query; and
   providing, by the user's computer, the search results to the user.

10. A computer-readable program non-transitory storage device embodying a program of instructions executable by the computer that prepare a user's computer for an enterprise content search, which instructions, when executed by the computer, cause the computer to perform the steps of:

receiving, at the user's computer, from a remote content repository at least one metadata portion in response to a request, the at least one metadata portion corresponding to at least one content file stored in the remote content repository;

the at least one metadata portion corresponding to the at least one content file, the at least one metadata portion comprising (a) one or more keywords regarding the corresponding content file and (b) a network location of the corresponding content file;

converting, by the user's computer, data of the at least one metadata portion from a first format to a second format;

storing, by the user's computer, on a local filesystem of the user's computer, at least one searchable metadata file that conforms to the second format, the at least one searchable metadata file comprising (a) the one or more keywords regarding the content file that corresponds to the at least one searchable metadata portion, and (b) the network location of the content file that corresponds to the at least one metadata portion, wherein the at least one searchable metadata file is stored in a manner that allows a desktop search engine running on the user's computer to index the contents of the at least one searchable metadata file;

creating, by the user's computer and in response to receiving the at least one metadata portion, an index file on the user's computer, the index file including an index of the contents of the at least one searchable metadata file stored on the local filesystem of the user's computer;

creating a searchable link from the at least one searchable metadata file wherein the searchable link is an HTML document and includes code and metadata of the corresponding content file; and clicking on the searchable link to execute the code in the searchable link to retrieve credential data and to redirect the user's computer to the corresponding content file's location by creating a launchable link to the corresponding content file's location wherein the launchable link is a URL and includes the credential data.

11. The computer-readable program non-transitory storage device of claim 10, further comprising instructions which when executed by the computer, cause the computer to perform the steps of:

receiving, from the user at the user's computer, credential data to authorize the user to access the plurality of content files;

storing the credential data on a local filesystem of the user's computer;

wherein storing at least one searchable metadata file further comprises storing (d) one or more scripts which, when executed by an agent running on the user's computer, cause the agent to (1) read the credential data from a local filesystem of the user's computer and (2) retrieve, using the credential data, the at least one content file that corresponds to the at least one searchable metadata file from the remote content repository.

12. The computer-readable program non-transitory storage device of claim 10, wherein the network location of the corresponding content file is specified as a Uniform Resource Locator (URL).

13. The computer-readable program non-transitory storage device of claim 10, wherein the at least one searchable metadata file stored on the filesystem of the user's computer is a Hypertext Markup Language (HTML) document.

14. The computer-readable program non-transitory storage device of claim 10, wherein the at least one metadata portion is received in an extensible markup language (XML) document.

15. The computer-readable program non-transitory storage device of claim 10, wherein said first format is extensible markup language (XML) and said second format is Hypertext Markup Language (HTML), and converting data of the at least one metadata portion includes converting XML data to HTML data.

16. The computer-readable program non-transitory storage device of claim 15, wherein said converting XML data to HTML data includes replacing one or more extensible markup language (XML) elements with a "SPAN" tag.

17. The computer-readable storage device of claim 10, further comprising instructions which when executed by the computer cause the computer to perform the steps of:

indexing the at least one metadata file by a desktop search engine installed on the user's computer.

18. A computer system for preparing a user's computer for an enterprise content search, comprising:

a network interface that is coupled to a data network for receiving one or more packet flows therefrom;

a processor;

means for receiving, at the user's computer, from a remote content repository at least one metadata portion in response to a request, the at least one metadata portion corresponding to at least one content file stored in the remote content repository;

metadata portion corresponding to one content file, the at least one metadata portion comprising (a) one or more keywords regarding the corresponding content file and (b) a network location of the corresponding content file;

means for converting data of the at least one metadata portion from a first format to a second format;

means for storing, on a local filesystem of the user's computer, at least one searchable metadata file that conforms to the second format, the at least one searchable metadata file comprising (a) the one or more keywords regarding the content file that corresponds to the at least one searchable metadata portion, and (b) the network location of the content file that corresponds to the at least one searchable metadata portion, wherein the at least one searchable metadata file is stored in a manner that allows a desktop search engine running on the user's computer to index the contents of the at least one searchable metadata file;

means for creating an index file on the user's computer in response to receiving the at least one metadata portion, the index file including an index of the contents of the at least one searchable metadata file stored on the local filesystem of the user's computer;

means for creating a searchable link from the at least one searchable metadata file wherein the searchable link is an HTML document and includes code and metadata of the corresponding content file; and means for clicking on the searchable link to execute the code in the searchable link to retrieve credential data and to redirect the user's computer to the corresponding content file's location by creating a launchable link to the corresponding content file's location wherein the launchable link is a URL and includes the credential data.

19. The computer system of claim 18, further comprising:

means for receiving, from the user at the user's computer, credential data to authorize the user to access the at least one content file;

means for storing the credential data on a local filesystem of the user's computer;

wherein the means for storing at least one metadata file further comprises means for storing (d) one or more scripts which, when executed by an agent running on the user's computer, cause the agent to (1) read the credential data from a local filesystem of the user's computer and (2) retrieve, using the credential data, the content file that corresponds to the one or more metadata file from the remote content repository.

\* \* \* \* \*

UNITED STATES PATENT AND TRADEMARK OFFICE
CERTIFICATE OF CORRECTION

PATENT NO.        : 8,027,976 B1
APPLICATION NO.   : 11/211070
DATED             : September 27, 2011
INVENTOR(S)       : Ding et al.

It is certified that error appears in the above-identified patent and that said Letters Patent is hereby corrected as shown below:

In column 5, line 9, before "each" delete "a".

In column 5, line 63, delete "David&sso_pasword" and insert -- David&sso_password --, therefor.

In column 5, line 66, after "is" insert -- a --.

In column 7, line 17, delete "tag." and insert -- tag --, therefor.

In column 7, line 17, delete "replace'r" and insert -- replacer --, therefor.

In column 8, line 11, in Claim 1, delete "file;" and insert -- file, --, therefor.

In column 8, line 18, in Claim 1, delete "location wherein" and insert -- location, wherein --, therefor.

In column 8, line 54, in Claim 9, after "comprising" insert -- : --.

In column 9, line 32, in Claim 10, delete "file wherein" and insert -- file, wherein --, therefor.

In column 9, line 40, in Claim 10, delete "location wherein" and insert -- location, wherein --, therefor.

In column 10, line 54, in Claim 18, delete "file wherein" and insert -- file, wherein --, therefor.

In column 10, line 61, In Claim 18, delete "location wherein" and insert -- location, wherein --, therefor.

Signed and Sealed this
Tenth Day of January, 2012

David J. Kappos
*Director of the United States Patent and Trademark Office*